United States Patent
Shimizu

(10) Patent No.: US 7,869,807 B2
(45) Date of Patent: Jan. 11, 2011

(54) METHOD OF MANAGING A CODE IDENTIFYING A WIRELESS DEVICE WITH CONFLICT MINIMIZED IN A WIRELESS TELECOMMUNICATIONS SYSTEM

(75) Inventor: Takahiro Shimizu, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 881 days.

(21) Appl. No.: 11/762,230

(22) Filed: Jun. 13, 2007

(65) Prior Publication Data
US 2008/0004017 A1   Jan. 3, 2008

(30) Foreign Application Priority Data
Jun. 30, 2006   (JP) .............................. 2006-180979

(51) Int. Cl.
*H04W 4/00* (2009.01)
*H04J 3/22* (2006.01)

(52) U.S. Cl. .................................... 455/435.1; 370/471
(58) Field of Classification Search .............. 455/435.1, 455/422.1, 437, 438; 370/338, 471
See application file for complete search history.

(56) References Cited

U.S. PATENT DOCUMENTS

| 7,715,885 B2* | 5/2010 | Arunan et al. ............... 455/574 |
| 7,720,026 B2* | 5/2010 | Chen et al. ................... 370/328 |
| 2005/0078646 A1 | 4/2005 | Hong et al. |
| 2008/0259895 A1* | 10/2008 | Habetha et al. ............. 370/345 |

* cited by examiner

*Primary Examiner*—Michael T Thier
(74) *Attorney, Agent, or Firm*—Volentine & Whitt, PLLC

(57) ABSTRACT

In one wireless device, when wishing to participate in a communications network, an ID generator in an ID manager uses a hash function on the address of the device and time to generate a device identification identifying the one device, and registers the identification on a list storage. In the one wireless device, a list updater stores an identification of another device from a beacon signal into the list storage in association with the address of the other device. When a conflict determiner detects a conflict of device identifications, an ID searcher searches the list storage for an unused identification having a relationship with the conflicting identification according to a relation in magnitude between the addresses of the one and other devices. An ID updater updates the identification of the device in the list storage to the unused identification thus searched for as a new identification.

4 Claims, 3 Drawing Sheets

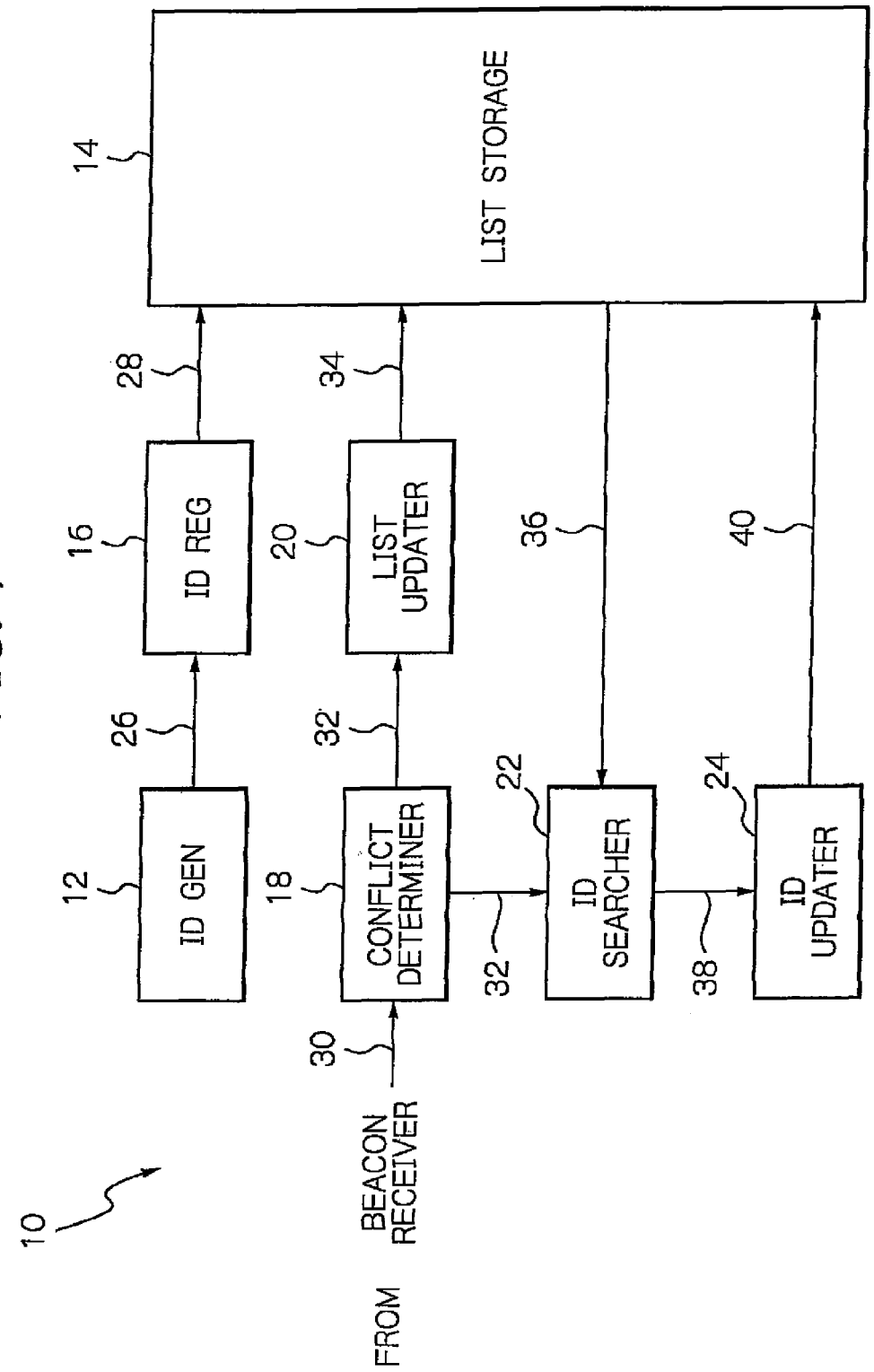

FIG.2A

| #1 |
|---|
| PP : — |
| AD : 0125 |
| ID : 11 |
| NP : — |

FIG.2B

| #1 | #2 | #3 | #4 |
|---|---|---|---|
| PP : #3 | PP : #1 | PP : — | PP : #2 |
| AD : 0125 | AD : 1251 | AD : 0130 | AD : 1240 |
| ID : 11 | ID : 23 | ID : 9 | ID : 26 |
| NP : #2 | NP : #4 | NP : #1 | NP : — |

FIG.2C

| #1 | #2 | #3 | #4 | #5 |
|---|---|---|---|---|
| PP : #3 | PP : #5 | PP : — | PP : #2 | PP : #1 |
| AD : 0125 | AD : 1251 | AD : 0130 | AD : 1240 | AD : 0128 |
| ID : 11 | ID : 23 | ID : 9 | ID : 26 | ID : 12 |
| NP : #5 | NP : #4 | NP : #1 | NP : — | NP : #2 |

FIG.2D

| #1 | #2 | #3 | #4 | #5 |
|---|---|---|---|---|
| PP : #5 | PP : #1 | PP : — | PP : #2 | PP : #3 |
| AD : 0125 | AD : 1251 | AD : 0130 | AD : 1240 | AD : 0128 |
| ID : 13 | ID : 23 | ID : 9 | ID : 26 | ID : 12 |
| NP : #2 | NP : #4 | NP : #1 | NP : — | NP : #1 |

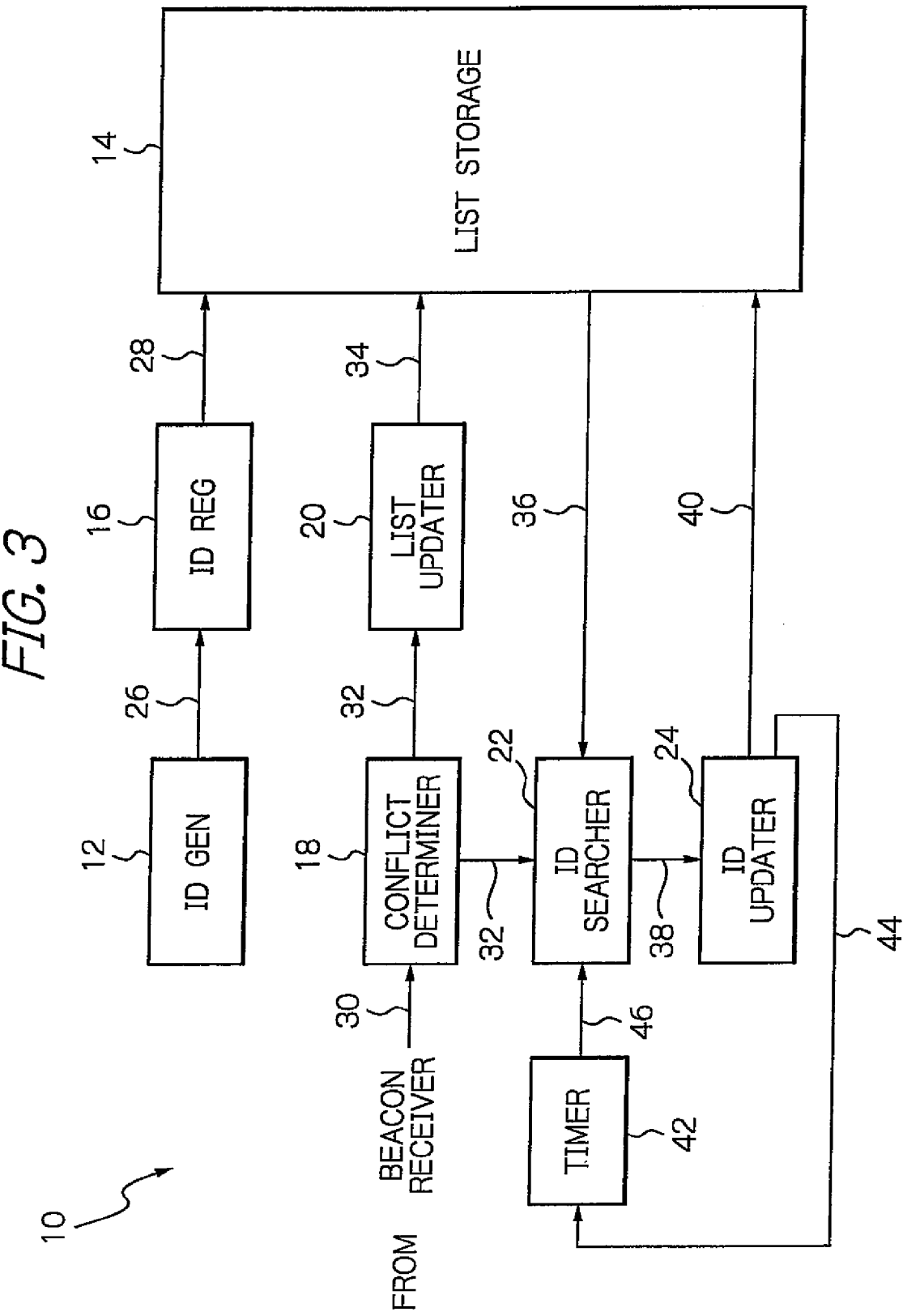

METHOD OF MANAGING A CODE IDENTIFYING A WIRELESS DEVICE WITH CONFLICT MINIMIZED IN A WIRELESS TELECOMMUNICATIONS SYSTEM

BACKGROUND OF THE INVENTION

1. Field of the Invention

The present invention relates to a method of managing a code identifying a wireless device in a wireless telecommunications system, and particularly, to such a method advantageously applicable to an ultra-wide band (UWB) wireless telecommunications system.

2. Description of the Background Art

The Multi-Band Orthogonal Frequency Division Multiplexing (OFDM) Alliance (MBOA), an industrial standardization organization, establishes a standard entitled "UWB MBOA MCA (Multiple Channel Access) V0.70", regulating that telecommunications devices communicating with each other in a wireless telecommunications network forming a service area, referred to as an extended cluster, generate independently of each other at random a device identification (ID), which is referred to as DEVID and used for transmitting and receiving data. The device ID includes two octets ranging from 0x0200 to 0xFFFF. Note that "0x" means that a numeral and/or a letter following "0x" represent a hexadecimal number.

Any of the devices when intending to participate in the wireless network independently generates its device identification, and transmits the device identification on a beacon signal along with an eight-octet device address AD specifically allocated in advance to the device. In order to prevent the device identifications thus generated from competing or overlapping with each other, each device monitors the beacon signals transmitted from the other devices. Any device, when having found out that it uses the same device identification as another device, has to generate a new device identification.

The device identifications conflict or collision can be detected when one wireless device receives a beacon signal from another device and determines that the same device identification as itself is included in the beacon signal, or when beacon signals transmitted from first and second devices are determined by a third device as including the same device identification as each other.

For the former case, both of the devices, when having found the collision or conflict, will stop using the conflicting or competing device identifications, and generate new device identifications. For the latter case, the third device, when having found the collision, transmits to the first and second devices a beacon signal informing them of the collision to urge both of them to generate new device identifications.

It is thus ensured that the device identification specific to each device be unique throughout the wireless network in which the respective devices participate. The device identification may thus use not a long, eight-octet device address but a short, two-octet device identification, thereby allowing data transmission and reception.

U.S. patent application publication No. US 2005/0078646 A1 to Hong et al., teaches a method and a system that allow efficient communications between a child piconet coordinator (PNC) and a destination device. The method and system intend to allow a first device that belongs to a parent piconet and at the same time is the coordinator of a child piconet (child PNC) to appropriately communicate with a second device that exists in the parent piconet or in the child piconet even with their device identifications overlapping. Hong et al., further teaches that the method and system use an identifier for identifying the piconets and the device identifications specifically allocated to the respective devices to generate a command frame requesting a channel time or interval during which the first and second devices may communicate with each other, and at the first stage, transmit the command frame to the coordinator of the parent piconet (parent PNC), and at the second stager allow the parent PNC to which the command frame is transmitted to allocate the channel interval during which the first and second devices may communicate with each other, allowing at the third stage the first and second devices to transmit and receive data between them during the channel interval.

The "UWB MBOA MCA V0.70" standard defines that, when the device identifications conflict with each other, the conflicting device identifications are refrained from being used, and each device should generate a new device identification. The standard fails, however, to specifically define how to generate a new device identification. If a use is made of, for example, each device simply setting device identifications sequentially from 0x0200 or simply incrementing device identifications by one upon conflict or collision occurring, collisions would occur more frequently, thus adversely affecting the actual data transmitting and receiving.

SUMMARY OF THE INVENTION

It is therefore an object of the present invention to provide a method of managing a code with a possibility minimized in code conflict or collision in a wireless telecommunications system.

In accordance with the present invention, in a wireless telecommunications system including a plurality of wireless devices, each of the plurality of wireless devices having a specific address, and independently generating a code for identifying the wireless device, declaring the specific address and the code on a beacon signal and participating in a communications network, a method of managing the code comprises: a first step of allowing one of the plurality of wireless devices which wishes to participate in the communications network to use a hash function based on the specific address of the one wireless device and a time at which the one wireless device wishes to participate to generate a code for the one wireless device; a second step of registering the code for the one wireless device in association with the specific address of the one wireless device; a third step of receiving a beacon signal transmitted from another wireless device and determining whether or not the code included in the signal conflicts with the code for the one wireless device; a fourth step of storing, when said third step detects a non-conflicting new code, the new code in association with the specific address of the other wireless device; a fifth step of searching, when said third step detects a conflicting code, codes stored in the one wireless device for a code that has a predetermined relationship with the conflicting code according to a relation in magnitude between the specific addresses of the one wireless device and the other wireless device; and a sixth step of updating the code for the one wireless device registered in said second step to the code that is searched for in said fifth step.

Also, in accordance with the present invention, in a wireless telecommunications system including a plurality of wireless devices, each of the plurality of wireless devices having a specific address, independently generating a code for identifying the wireless device, declaring the specific address and the code on a beacon signal and participating in a communications network, a method of managing the code comprises: a first step of allowing one of the plurality of wireless devices which wishes to participate in the communications network to use a hash function based on the specific address of the one wireless device and a time at which the one wireless device wishes to participate to generate a code for the one wireless device; a second step of registering the code for the one wireless device in association with the specific address of the one wireless device; a third step of receiving a beacon signal transmitted from another wireless device and determining whether or not the code included in the signal conflicts with the code for the one wireless device; a fourth step of storing, when said third step detects a non-conflicting new code, the new code in association with the specific address of the other wireless device; a fifth step of searching, when said third step detects a conflicting code, codes stored in the one wireless device according to a relation in magnitude between the specific addresses of the one wireless device and the other wireless device, for an unused code that has a first relationship with the conflicting code detected in said third step when no change instruction is given for the conflicting code detected in said third step, and for an unused code that has a second relationship with the conflicting code detected in said third step when a change instruction is given for the conflicting code detected in said third step, the second relationship being opposite to the first relationship; a sixth step of updating the code for the one wireless device registered in said second step to the code that is searched for in said fifth step; and a seventh step of measuring a period of time elapsed from the update, outputting the change instruction until a predetermined period of time has elapsed which is based on a random number generated according to the specific address of the one wireless device, and stopping the output of the change instruction after the period of time based on the random number has elapsed.

According to the present invention, one wireless device that wishes to participate in a communications network uses a hash function based on the specific address of the one device and the time at which the one device wishes to participate to generate a specific code for the one device, thus providing a code that is much less likely to conflict with other codes. Also, according to the present invention, when the conflict occurs, the relation in magnitude between the specific addresses of the one device and another wireless device may be used to search for a code that has a predetermined relationship with the conflicting code, thus providing a changed ore renewed code that is much less likely to conflict again with other codes.

BRIEF DESCRIPTION OF THE DRAWINGS

The objects and features of the present invention will become more apparent from consideration of the following detailed description taken in conjunction with the accompanying drawings in which:

FIG. 1 is a schematic block diagram showing the configuration of an illustrative embodiment of a device identification manager according to the present invention;

FIGS. 2A to 2D show how the list storage operates in the identification manager shown in FIG. 1; and FIG. 3 is a schematic block diagram showing the configuration of an alternative embodiment of an identification manager according to the present invention.

DESCRIPTION OF THE PREFERRED EMBODIMENTS

Referring now to the accompanying drawings, illustrative embodiments of a method of managing a code in a wireless telecommunications system according to the present invention will be described in more detail. With reference to FIG. 1, the illustrative embodiment of a method of managing a code according to the present invention is applied to an identification manager 10 in a wireless telecommunications system, which may be specifically compliant with the "UWB MBOA MCA V0.70" standard.

The identification manager 10 includes an identification (ID) generator 12 which uses a summary function such as hash function in the embodiment, and is responsive to the address specific to a relevant telecommunications device on which the manager 10 is installed and the time at which the device wishes to participate in the communications network to generate a code for the relevant device. The manager 10 further includes an ID register 16 adapted to register the code for the relevant device in association with the specific address of the relevant device, a conflict determiner 18 adapted for receiving a beacon signal transmitted from another wireless device and determining whether or not the code included in the signal conflicts with the code for the relevant device, a list updater 20 adapted for storing, when the determination detects a new non-conflicting code, the new code in association with the specific address of the other wireless device, an ID searcher 22 adapted for searching, when the determination indicates a conflicting code, codes already stored in the relevant device for a code that has a predetermined relationship with the conflicting code according to the relation in magnitude between the specific addresses of the relevant and other wireless devices, and an ID updater 24 adapted for updating the code for the relevant device registered in the registration operation to the code searched for in the searching. The identification manager 10 thus provides a code that is much less likely to conflict or collided with other codes, and also a renewed code much less likely to conflict with other codes.

The instant illustrative embodiment is directed to the identification manager 10 to which a method of managing a code according to the present invention is applied in a wireless telecommunications system. Elements and components not directly relating to understanding the present invention will be omitted from the description and illustration.

The identification manager 10 is installed in each of the wireless devices constituting an ultra-wide band (UWB) wireless telecommunications system, and has a function of managing the device identification that identifies the relevant device on which it is installed.

The ID generator 12 has a function of generating a device identification ID, when the device intends to participate in the wireless network, independently or regardless of other devices. The ID generator 12 uses a hash function based on an eight-octet device address AD specifically allocated in advance to the relevant device and the time generated by a system timer, now shown, to generate a two-octet device identification. The ID generator 12 outputs the generated device identification 26 to the ID register 16.

The list storage 14 has a function of storing therein and outputting generated device identifications. The list storage 14 stores a set of the device address AD and the device identification ID of the device in question, when intending to participate in the wireless network in the order of the device identifications. Specifically, the list storage 14 has a function of using, for the respective devices, four pieces of information including a previous pointer PP, the device address AD, the device identification ID, and a next pointer NP, and particularly using the previous pointer PP and the next pointer NP, to align and link the device identifications in ascending order.

The ID register 16 has a function of registering device identifications in the list storage 14. The ID register 16 receives the input device identification 26, and outputs a device identification 28 to the list storage 14 as registration information. The device identification 28 will sequentially be stored in the list storage 14. In the description, signals are designated with reference numbers of connections on which they are conveyed.

The conflict determiner 18 has a function of receiving a beacon signal 30 supplied from a beacon receiver, not-shown, included in the device in question, the beacon signal being received from other devices by the beacon receiver, and examining the signal to determine whether or not the device identification of the relevant device conflicts with a device identification carried on the received signal. The conflict determiner 18 outputs, when a new non-conflicting device identification is found, the found device identification 32 to the list updater 20 and the ID searcher 22.

The list updater 20 has a function of additively storing, when such a new non-conflicting device identification is found, the found device identification 32 into the list storage 14. The list updater 20 is thus responsive to a new device identification is found as non-conflicting to additively store the found device identification 32 into the list storage 14 as a device identification 34.

The ID searcher 22 has a function of being responsive to a conflicting device identification 32 supplied to read out device identifications 36 stored in the list storage 14, and compare the conflicting device identification 32 with the read-out device identifications 36 to search for an unused device identification. The ID searcher 22 starts searching when supplied with the conflicting device identification 32, and outputs an unused device identification 38 searched for to the ID updater 24.

The ID updater 24 functions as updating the device identification of the relevant device to the unused device identification thus searched for. The ID updater 24 supplies the list storage 14 with the unused device identification 40 searched for in order to change the current device identification of the relevant device to the unused device identification 40 thus searched for.

A description will now be given of the operation of the identification manager 10 according to the present invention additionally with reference to FIGS. 2A to 2D. Those figures are directed to the operation of device ID code management when a change does not occur in content of the list storage 14, i.e. no conflict occurs, and when a conflict occurs through, for example, the generation, detection and update of device identifications.

For simplicity, in FIGS. 2A to 2D, the device address AD is denoted by a four-digit decimal number and the device identification is denoted by a two-digit decimal number. The storage location on the memory space of the list storage 14 is denoted by a sharp "#" followed by a number.

A description will first be given of the device identification code management when no conflict occurs. When the wireless device intends to participate in the wireless network, the ID generator 12 uses a hash function based on the device address AD allocated in advance to the device and the time generated by the system timer to preliminarily generate a device identification ID.

The generated device identification ID is transmitted on a beacon signal together with the device address AD. The device identification 26 is given to the ID register 16, and stored in the list storage 14 together with the device address AD in combination, as shown in FIG. 2A. Specifically, the storage location #1 stores the device address AD=0125 of the relevant device and the generated device identification ID=11. At this time point, the device identifications of other devices are unknown and thus not stored, and the previous pointer PP and the next pointer NP are not shown.

Upon receipt of the beacon signal 30, it is detected that a device with a device address AD=1251 transmits using a device identification ID=23, and then the conflict determiner 18 determines whether or not the device identification ID=23 conflicts with the device identification (ID=11) of the relevant device. The device identifications do not conflict with each other in this example, and therefore the list updater 20 is started. The list updater 20 stores at the storage location #2 the detected device address AD=1251 and the device identification ID=23, as shown in FIG. 2B. Because the device identification ID=23 at the storage location #2 is larger than the device identification ID=11 at the storage location #1, the next pointer NP at the storage location #1 is set to pointing the location #2, and the previous pointer PP at the storage location #2 is set to pointing the location #1.

Afterwards, a beacon signal 30 is received again. Upon this receipt, it is detected in this example that a device with a device address AD=0130 is transmitting using a device identification ID=9. The conflict determiner 18 then determines that the device identification ID=9 does not conflict with the device identification of the relevant device. The list updater 20 stores, in response to the determination result, the detected device address AD=0130 and the device identification ID=9 at the storage location #3 in the list storage 14. Because the device identification ID=9 at the storage location #3 is smaller than the device identification ID=11 at the storage location #1, the previous pointer PP at the storage location #1 is set to pointing #3 and the next pointer NP at the storage location #3 is set to pointing #1.

Also, upon receipt of the beacon signal 30, it is detected that a device with a device address AD=1240 is transmitting using a device identification ID=26 in this example. The conflict determiner 18 then determines that the device identification ID 26 does not conflict with the device identification of the relevant device. The list updater 20 stores, in response to the determination result, the detected device address AD=1240 and the device identification ID=26 at the storage location #4. Because the device identification ID=26 at the storage location #4 is larger than the device identification ID=23 at the storage location #2, the previous pointer PP at the storage location #4 is set to pointing #2 and the next pointer NP at the storage location #2 is set to pointing #4. As shown in FIG. 2B, the device identification of the relevant device at the storage location #1 is linked with other device identifications in ascending order via the previous pointer PP and the next pointer NP, thus generating an identification list.

Then, upon receipt of a further beacon signal 30, it is detected that a device with a device address AD=0128 is transmitting using the device identification ID=12. The conflict determiner 18 then determines that the device identification ID=12 does not conflict with the device identification of the relevant device. The list updater 20 stores the detected device address AD=0128 and the device identification ID=12 at the storage location #5. Because the device identification ID=12 intervenes between the device identification ID=11 at the storage location #1 and the device identification ID=23 at the storage location #2, the previous pointer at the storage location #5 is set to pointing #1 and the next pointer NP is set to pointing #2. The next pointer NP at the storage location #1 and the previous pointer PP at the storage location #2 are both changed to pointing #5.

A description will be now given of the device identification code management when conflict occurs. In this example, the communications network is operated with five device identifications ID stored in the list storage 14 as shown in FIG. 2C, and upon receipt of a beacon signal 30 it is detected that a device with a device address AD=0120 is transmitting using a device identification ID=11.

The conflict determiner 18 determines that the device identification ID=11 is the same as, and hence conflicts with, the device identification of the relevant device. In response to that determination, the ID searcher 22 is started. The conflict determiner 18 is adapted to start the ID searcher 22 also when the conflict determiner 18 is informed of a conflict by the beacon signal 30 received from a third wireless device that has found that conflict.

Because the device address AD (=0125) of the relevant device is larger than the device address AD (=0120) of the conflicting device, the ID searcher 22 searches the list storage 14 in sequence for an unused device identification that is larger than the device identification of the relevant device (ID=11).

The ID searcher 22 first checks the device identification ID at the storage location #5 indicated by the next pointer NP at the storage location #1. The device identification ID of the storage location #5 is equal to "12", which is next to the device identification of the relevant device, thus no unused number exists therebetween. The ID searcher 22 then further checks the device identification ID at the storage location #2 indicated by the next pointer NP at the storage location #5. The device identification ID of the storage location #2 is equal to "23", meaning that the device identifications ranging from "13" to "22" are unused. The searcher 22 then instructs the ID updater 24 to change the device identification of the relevant device to "13".

The device identification ID may not necessarily be changed to "13", but to other numbers such as "14" or "15". Specifically, any unused number may be used which is larger than the conflicting number.

The ID updater 24 changes the device identification of the relevant device (ID=11), stored in the storage location #1, to "13", the previous pointer PP to pointing #5, and the next pointer NP to pointing #2. The changed device identification is reflected to the beacon signals that will be transmitted thereafter. If the detection of the device identifications conflicting reveals that the device address AD of the relevant device is smaller than that of the conflicting device, then the ID searcher 22 searches the list storage 14 in sequence for an unused device identification that is larger than the device identification of the relevant device. Any unused number that is smaller than the conflicting number may be selected.

The ID searcher 22 searches, when the relevant device has a larger device address AD than the conflicting device, the list storage 14 in sequence for an unused device identification that is larger than the device identification of the relevant device. Alternatively, the ID searcher 22 may be adapted to search the list storage 14 in sequence for an unused device identification which is smaller than the device identification of the relevant device.

The identification manager 10 in the instant illustrative embodiment, which operates as described above, may include one or more advantages to read below. First, because the device identification is generated using a hash function based on the device address AD of the relevant device and the time generated by the system timer, the generated device identification is much less likely to conflict with other device identifications. Second, because the generated device identification is much less likely to conflict with other device identifications, it is possible to use, without searching the beacon signals 30 from other devices in advance for a device identification in use, the generated device identification to immediately participate in the wireless network. Third, two devices, when conflicting with each other, search for unused device identifications in opposite directions, so that the device identifications changed by the devices are less likely to conflict again. Fourth, even when a conflicting device modifies the device identification in a manner different from that described above, the device identifications changed by the two devices are less likely to conflict again.

Note that FIGS. 2A to 2D show the exemplified content of the list storage 14. It is to be understood that any contents may be applicable where a set of a device address AD and a device identification ID may optionally be searched for in the order of device identifications.

FIG. 3 shows an alternative embodiment of the identification manager 10 to which the present invention is applied. In the alternative embodiment, the components common to those shown in FIG. 1 will be designated with the same reference numerals, and repetitive description thereon will be omitted for simplicity.

In the alternative embodiment, the identification manager 10 includes in addition to the components shown in FIG. 1 a timer 42 that is adapted to measure a period of time elapsed after a device identification is changed due to conflict. The ID searcher 22 and ID updater 24 in the alternative embodiment have the functions described above but slightly modified, which will be described below.

The ID updater 24 has a function of changing, according to an instruction provided from the ID searcher 22, the device identification of the relevant device stored in the list storage 14, and outputting a starting signal STA (44) for starting the timer 42. The timer 44 has a function of measuring an elapsed time after the starting signal STA (STArt) (44) is given, outputting a change instruction signal CNG (ChaNGe) (46) until a predetermined period of time has elapsed that is set using a random number with the device address AD of the relevant device as its initial value, and stopping the output of the change instruction signal CNG (46) when the predetermined period of time has elapsed. The change instruction signal CNG (46) is output to the ID searcher 22.

The ID searcher 22 is started by the conflict determiner 18, and operates, when the change instruction signal CNG (46) is not given, in the same way as in the illustrative embodiment shown in and described with reference to FIG. 1. Specifically, the ID searcher 22 searches, when the device address AD of the relevant device is larger than the device address AD of a conflicting device, the list storage 14 in terms of device identifications ID larger than the device identification of the relevant device in sequence for an unused device identification. The ID searcher 22 also searches, when the device address AD of the relevant device is smaller than the device address AD of the conflicting device, the device identifications ID smaller than the device identification of the relevant device in sequence for an unused device identification.

The ID searcher 22 also has a function of searching, when started by the conflict determiner 18 and given the change instruction signal CNG (46), device identifications ID in the opposite direction. Specifically, the ID searcher 22 searches, when the device address AD of the relevant device is larger than the device address AD of a conflicting device, the list storage 14 in terms of device identifications ID smaller than the device identification of the relevant device in sequence for an unused device identification. The ID searcher 22 also searches, when the device address AD of the relevant device is smaller than the device address AD of the conflicting device, the device identifications ID larger than the device identification of the relevant device in sequence for an unused device identification.

After a conflict occurs and the device identification of the relevant device is changed, if such a renewed device identification again conflicts prior to the predetermined period of time set on the timer 42 expiring, then the identification manager 10 searches the unused device identifications in the opposite direction for a further new device identification. Except the above-stated case, the identification manager 10 operates in the same way as in the illustrative embodiment shown in FIG. 1.

The identification manager 10 in the alternative embodiment thus has the following further advantages in addition to the advantages involved in the illustrative embodiment shown in FIG. 1. If the identification manager 10 experiences a device identification conflict repetitively in a short period of time, it is then highly possible that both of the conflicting wireless devices change device identifications according to the same logic as each other. Thus, fifthly, the identification manager 10 may switch its operative logic to be used so as to make it more possible to prevent conflict from occurring repetitively.

In the alternative embodiment, the monitoring period of time of the timer 42 is set using a random number based on the device address AD of the relevant device. Thus, sixthly, even when the same logic is used, the logic may be switched at a different time, thus making it more possible to prevent conflict from occurring again.

Note that although the illustrative embodiments of the present invention have been described with respect to a device in a wireless telecommunications system that is compliant with the "UWB MBOA MCA V0.70" standard, the present invention is not specifically limited thereto. The invention may be applied to any type of wireless telecommunications systems where each wireless device can set its device identification independently of others.

The entire disclosure of Japanese patent application No. 2006-180979 filed on Jun. 30, 2006, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A method of managing a code for use in a wireless telecommunications system including a plurality of wireless devices, each of the plurality of wireless devices having a specific address, and independently generating a code for identifying the wireless device, declaring the specific address and the code on a beacon signal and participating in a communications network, said method comprising:
    a first step of allowing one wireless device among the plurality of wireless devices which wishes to participate in the communications network to use a hash function based on the specific address of the one wireless device and a time at which the one wireless device wishes to participate to generate a code for the one wireless device;
    a second step of registering the code for the one wireless device in association with the specific address of the one wireless device;
    a third step of receiving a beacon signal transmitted from an other wireless device among the plurality of wireless devices and determining whether or not the code included in the signal conflicts with the code for the one wireless device;
    a fourth step of storing, when said third step detects a non-conflicting new code, the new code in association with the specific address of the other wireless device;
    a fifth step of searching, when said third step detects a conflicting code, codes stored in the one wireless device for a code that has a predetermined relationship with the conflicting code according to a relation in magnitude between the specific addresses of the one wireless device and the other wireless device; and
    a sixth step of updating the code for the one wireless device registered in said second step to the code that is searched for in said fifth step,
    wherein the code having the predetermined relationship is an unused code larger than the conflicting code detected in said third step when the specific address of the one wireless device is larger than the specific address of the other wireless device, and an unused code smaller than the conflicting code detected in said third step when the specific address of the one wireless device is smaller than the specific address of the other wireless device.

2. A method of managing a code for use in a wireless telecommunications system including a plurality of wireless devices, each of the plurality of wireless devices having a specific address, and independently generating a code for identifying the wireless device, declaring the specific address and the code on a beacon signal and participating in a communications network, said method comprising:
    a first step of allowing one wireless device among the plurality of wireless devices which wishes to participate in the communications network to use a hash function based on the specific address of the one wireless device and a time at which the one wireless device wishes to participate to generate a code for the one wireless device;
    a second step of registering the code for the one wireless device in association with the specific address of the one wireless device;
    a third step of receiving a beacon signal transmitted from an other wireless device among the plurality of wireless devices and determining whether or not the code included in the signal conflicts with the code for the one wireless device;
    a fourth step of storing, when said third step detects a non-conflicting new code, the new code in association with the specific address of the other wireless device;
    a fifth step of searching, when said third step detects a conflicting code, codes stored in the one wireless device for a code that has a predetermined relationship with the conflicting code according to a relation in magnitude between the specific addresses of the one wireless device and the other wireless device; and
    a sixth step of updating the code for the one wireless device registered in said second step to the code that is searched for in said fifth step,
    wherein the code having the predetermined relationship is an unused code smaller than the conflicting code detected in said third step when the specific address of the one wireless device is larger than the specific address of the other wireless device, and an unused code larger than the conflicting code detected in said third step when the specific address of the one wireless device is smaller than the specific address of the other wireless device.

3. A method of managing a code for use in a wireless telecommunications system including a plurality of wireless devices, each of the plurality of wireless devices having a specific address, and independently generating a code for identifying the wireless device, declaring the specific address and the code on a beacon signal and participating in a communications network, said method comprising:

a first step of allowing one wireless device among the plurality of wireless device which wishes to participate in the communications network to use a hash function based on the specific address of the one wireless device and a time at which the one wireless device wishes to participate to generate a code for the one wireless device;

a second step of registering the code for the one wireless device in association with the specific address of the one wireless device;

a third step of receiving a beacon signal transmitted from an other wireless device among the plurality of wireless devices and determining whether or not the code included in the signal conflicts with the code for the one wireless device;

a fourth step of storing, when said third step detects a non-conflicting new code, the new code in association with the specific address of the other wireless device;

a fifth step of searching, when said third step detects a conflicting code, codes stored in the one wireless device according to a relation in magnitude between the specific addresses of the one wireless device and the other wireless device, for an unused code that has a first relationship with the conflicting code detected in said third step when no change instruction is given for the conflicting code detected in said third step, and for an unused code that has a second relationship with the conflicting code detected in said third step when the change instruction is given for the conflicting code detected in said third step, the second relationship being opposite to the first relationship;

a sixth step of updating the code for the one wireless device registered in said second step to the code that is searched for in said fifth step; and a seventh step of measuring a period of time elapsed from the update, outputting the change instruction until a predetermined period of time has elapsed which is based on a random number generated according to the specific address of the one wireless device, and stopping the output of the change instruction after the period of time based on the random number has elapsed.

4. The method in accordance with claim 3, wherein the code having the first relationship is a code larger than the conflicting code detected in said third step when the specific address of the one wireless device is larger than the specific address of the other wireless device, and a code smaller than the conflicting code detected in said third step when the specific address of the one wireless device is smaller than the specific address of the other wireless device.

* * * * *